(12) United States Patent
Zanzinger (10) Patent No.: US 12,023,828 B2
(45) Date of Patent: Jul. 2, 2024

(54) METHOD FOR MANUFACTURING A PLASTIC DRAIN SHEET, AND PLASTIC DRAIN SHEET

(71) Applicant: Helmut Zanzinger, Wallhausen (DE)

(72) Inventor: Helmut Zanzinger, Wallhausen (DE)

(73) Assignee: Helmut Zanzinger, Wallhausen (DE)

( * ) Notice: Subject to any disclaimer, the term of this patent is extended or adjusted under 35 U.S.C. 154(b) by 562 days.

(21) Appl. No.: 17/259,436

(22) PCT Filed: Jul. 10, 2019

(86) PCT No.: PCT/EP2019/068608
§ 371 (c)(1),
(2) Date: Jan. 11, 2021

(87) PCT Pub. No.: WO2020/011882
PCT Pub. Date: Jan. 16, 2020

(65) Prior Publication Data
US 2021/0276230 A1 Sep. 9, 2021

(30) Foreign Application Priority Data

Jul. 12, 2018 (DE) ...................... 10 2018 211 667.9

(51) Int. Cl.
*B29C 48/00* (2019.01)
*B29C 43/22* (2006.01)
(Continued)

(52) U.S. Cl.
CPC ............ *B29C 43/226* (2013.01); *B29C 43/26* (2013.01); *B29C 43/28* (2013.01); *B29C 43/46* (2013.01);
(Continued)

(58) Field of Classification Search
CPC ....... E02B 11/00; B29C 43/226; B29C 43/26; B29C 43/28; B29C 43/46; B29C 2043/462; B29C 2043/463; B29C 2043/464; B29C 43/222; B29C 48/12; B29C 48/08; B29C 48/156; B29C 48/0011; E02D 3/10
See application file for complete search history.

(56) References Cited

U.S. PATENT DOCUMENTS 3,795,180 A * 3/1974 Larsen .................... E01C 13/02
405/36
5,190,404 A 3/1993 Kiyokawa et al.
(Continued)

FOREIGN PATENT DOCUMENTS

CN 203077622 U 7/2013
CN 103507195 A 1/2014
(Continued)

*Primary Examiner* — Carib A Oquendo
(74) *Attorney, Agent, or Firm* — McGlew and Tuttle, P.C.

(57) ABSTRACT

The invention describes a method for manufacturing a plastic drain sheet, and a plastic drain sheet. For the purpose of manufacture, a sheet-like main body having a first surface and a second surface, spaced apart therefrom by a base sheet thickness, is provided. Grooves are introduced into the first surface and mating grooves are introduced into the second surface. The mating grooves and the grooves cross one another at crossing points. Through-openings between the grooves and the mating grooves are formed at the crossing points.

28 Claims, 6 Drawing Sheets

(51) Int. Cl.
  *B29C 43/26* (2006.01)
  *B29C 43/28* (2006.01)
  *B29C 43/46* (2006.01)
  *B29C 48/08* (2019.01)
  *B29C 48/12* (2019.01)
  *B29C 48/156* (2019.01)
  *E02B 11/00* (2006.01)

(52) U.S. Cl.
  CPC ......... *B29C 48/0011* (2019.02); *B29C 48/08* (2019.02); *B29C 48/12* (2019.02); *B29C 48/156* (2019.02); *E02B 11/00* (2013.01); *B29C 2043/462* (2013.01); *B29C 2043/463* (2013.01); *B29C 2043/464* (2013.01)

(56) References Cited

U.S. PATENT DOCUMENTS

| | | | | |
|---|---|---|---|---|
| 5,747,140 | A | * | 5/1998 | Heerklotz ............... A47C 27/15 |
| | | | | 428/184 |
| 5,752,784 | A | * | 5/1998 | Motz ..................... E01C 13/083 |
| | | | | 405/38 |
| 6,164,868 | A | * | 12/2000 | Goughnour ............. E02D 3/10 |
| | | | | 52/169.5 |
| 6,312,190 | B1 | * | 11/2001 | Goughnour ............... E02D 3/10 |
| | | | | 210/170.07 |
| 2003/0217457 | A1 | * | 11/2003 | Hwang .................. C25D 5/605 |
| | | | | 29/610.1 |
| 2008/0121121 | A1 | | 5/2008 | Van Vliet et al. |
| 2009/0041544 | A1 | * | 2/2009 | Ramsey ................ E02D 31/004 |
| | | | | 405/129.95 |
| 2017/0319404 | A1 | * | 11/2017 | Bewick-Sonntag ......................... |
| | | | | A61F 13/15699 |

FOREIGN PATENT DOCUMENTS

| | | |
|---|---|---|
| CN | 105799178 A | 7/2016 |
| CN | 207465698 U | 6/2018 |
| DE | 2400941 C2 | 5/1983 |
| DE | 10060977 A1 | 6/2002 |
| EP | 0278605 B1 | 9/1992 |
| FR | 2661435 A1 | 10/1991 |
| GB | 1427281 A | 3/1976 |
| JP | H07292701 A | 11/1995 |
| JP | H09242306 A | 9/1997 |
| JP | 2006037470 A | 2/2006 |
| JP | 2014211025 A | 11/2014 |
| WO | 9835742 A1 | 8/1998 |

* cited by examiner

METHOD FOR MANUFACTURING A PLASTIC DRAIN SHEET, AND PLASTIC DRAIN SHEET

CROSS-REFERENCES TO RELATED APPLICATIONS

This application claims the priority of German Patent Application, Serial No. DE 10 2018 211 667.9, filed Jul. 12, 2018, pursuant to 35 U.S.C. 119(a)-(d), the content of which is incorporated herein by reference in its entirety as if fully set forth herein.

FIELD OF THE INVENTION

The invention relates to a method for manufacturing a plastic drain sheet. In addition, the invention relates to a plastic drain sheet.

BACKGROUND OF THE INVENTION

Plastic drain sheets can also be referred to as Geosynthetic Drainage Sheets (GDS). They are used in mining, landfill construction, tunnel construction, road construction or further geotechnical applications. In this respect, a sufficiently high water discharge capability is intended to be ensured by means of the plastic drain sheets. Geonets (GNT) are usually used as plastic drain sheets, in particular in the case of very high degrees of pressure loading. Geonets are produced in installations designed specifically for this purpose. US 2009/0041544 A1 discloses geonets and a method for producing them.

DE 24 00 941 C2 discloses a method for producing plastic nets. After introducing grooves into the two surfaces of a plastic film, the plastic film is stretched and/or extended by a multiple of its length, for example by seven times its length. The resulting plastic net has dimensions, in particular a maximum film thickness of for example 0.38 mm, which are not viable for plastic drain sheets. In addition, on account of the stretching, the plastic nets are deformed by a multiple of their length in such a way that flow paths cannot form along the plastic nets. The plastic nets which can be produced in accordance with the method in DE 24 00 941 C2 cannot be used as plastic drain sheets.

SUMMARY OF THE INVENTION

An object of the present invention consists in specifying an improved method for manufacturing a plastic drain sheet. The method should in particular be flexible and enable the manufacture of plastic drain sheets that are able to bear high pressure loads.

Said object may be achieved by a method for manufacturing a plastic drain sheet, having the steps of:
- providing a sheet-like main body having a first surface and a second surface, spaced apart from the first surface by a base sheet thickness of the main body,
- introducing grooves into the first surface of the main body,
- introducing mating grooves into the second surface of the main body, wherein the mating grooves and the grooves cross one another at crossing points, and
- forming through-openings between the grooves and the mating grooves in the region of the crossing points to complete the plastic drain sheet.

A sheet-like main body having a first surface and a second surface, spaced apart from the first surface by a base sheet thickness of the main body, is provided. Grooves are introduced into the first surface of the main body and mating grooves are introduced into the second surface of the main body. The mating grooves and the grooves cross one another at crossing points. Through-openings between the grooves and the mating grooves are formed in the region of the crossing points for the purpose of manufacturing the plastic drain sheet.

According to the invention, it has been recognized that manufacturing the plastic drain sheet from a sheet-like main body increases the stability of the plastic drain sheet. The plastic drain sheet is manufactured integrally. Pressure loads are taken up and absorbed in the plastic drain sheet produced in this way via solid supporting points. Stability failure, as can occur for example in geonets owing to folding-down or unrolling of the separately manufactured strands, is avoided in the plastic drain sheet manufactured in this way. The plastic drain sheet has high stability, in particular high compressive strength, high shear strength, high contact shear strength and high dimensional stability. A sufficient water discharge capability is ensured over the entire service life of the plastic drain sheet, even in the case of high degrees of pressure loading.

Perpendicular to the base sheet thickness, the sheet-like main body provided has a longitudinal direction and a transverse direction. The longitudinal direction and the transverse direction span a sheet plane. The longitudinal direction is also referred to as the production direction (machine direction (MD)). The transverse direction is correspondingly referred to as transverse to the production direction (cross-machine direction (CMD)). In the sheet-like main body, the length of the main body, that is to say its extent in the longitudinal direction, and the width of the main body, that is to say the extent in the transverse direction, are substantially greater than the base sheet thickness. The main body has a planar form. The width and base sheet thickness of the main body can vary over the length of said main body. Preferably, however, the width and/or the base sheet thickness are constant. In the case of a constant base sheet thickness, the first surface and the second surface run parallel to one another and parallel to the sheet plane.

The through-openings constitute a perforation in the main body. The water permeability of the plastic drain sheet perpendicular to the sheet plane is ensured in this way. The water can flow into the grooves and mating grooves within the sheet plane and penetrate the plastic drain sheet via the through-openings perpendicular to the sheet plane.

The grooves and/or mating grooves can be introduced in a variety of ways, for example by removing material of the main body in the region of the grooves and/or mating grooves to be introduced. The grooves and/or mating grooves are preferably formed into the main body. The grooves and/or mating grooves can be formed in substantially without material removal. The grooves and/or mating grooves can be formed in together with or after the provision of the main body. By way of example, the grooves and/or mating grooves are embossed into the surfaces of the sheet-like main body by embossing rolls, in particular one or more smoothing calenders.

The plastic drain sheet is manufactured integrally from the main body by introducing grooves and mating grooves and forming the through-openings. The dimensions of the finished plastic drain sheet thus correspond substantially to the original dimensions described above of the main body provided. However, on account of the introduction of the grooves and/or mating grooves, changes in the thickness of the main body perpendicular to the sheet plane may arise.

When the grooves and/or mating grooves are being formed in without material removal, in particular in the case of embossing, the material of the main body that was located previously in the region of the grooves and/or mating grooves is displaced. As a result of this material displacement, the thickness of the main body and thus the thickness of the plastic drain sheet are increased in comparison with the base sheet thickness with which the main body is provided. To clearly distinguish the possibly changing thickness, the term "base sheet thickness" is used to refer to the thickness of the main body provided before the grooves and/or mating grooves are introduced. By contrast, the term "sheet thickness" is intended to refer to the thickness of the main body after the grooves and mating grooves are formed in. The term "sheet thickness" thus refers to the thickness of the main body of the finished plastic drain sheet.

The sheet thickness can be, for example, between 4 mm and 20 mm, in particular between 4 mm and 10 mm. If the grooves and/or mating grooves are formed in, in particular embossed, the main body has to be provided with a correspondingly lower base sheet thickness, for example of between 2 mm and 10 mm, in particular of between 2 mm and 5 mm. In some cases, the forming in of the grooves and/or mating grooves can lead to the base sheet thickness being doubled, in particular tripled, as a result of the material displacement. If, by contrast, the grooves and/or mating grooves are introduced into the main body by material removal, the sheet thickness of the main body of the finished plastic drain sheet corresponds substantially to the base sheet thickness.

The width of the plastic drain sheet corresponds substantially to the width of the main body provided. In some embodiments of the method, the width of the plastic drain sheet can be varied in a targeted manner with respect to the main body originally provided. The main body can thus for example be drawn out longitudinally in the production direction, whereupon a reduction in the width of the plastic drain sheet occurs. This is also referred to as stretching of the main body. Stretching can take place in particular by virtue of a drawing-off speed of a smoothing calender that is elevated in comparison with a conveying speed of the main body. As an alternative, the main body can also be gripped at longitudinal edges running parallel to the longitudinal direction and be drawn out widthwise, as a result of which the width of the plastic drain sheet is increased. This operation is also referred to as extending. It is thus possible to influence the width of the plastic drain sheet in a targeted manner and adapt it to the respective usage situation.

The first surface and the grooves introduced therein constitute a first functional layer of the plastic drain sheet. The second surface and the mating grooves introduced therein constitute a second functional layer of the plastic drain sheet. The functional layers allow water to be discharged along the sheet plane of the main body via the grooves and/or mating grooves. The functional layers of the plastic drain sheet are fluidically connected to one another via the through-openings.

The method can be flexibly adapted to the requirements set for the plastic drain sheet to be manufactured. In particular, the method offers a great degree of design freedom for the arrangement, structure and cross section of the grooves and mating grooves. In this way, in particular the water mobility of the grooves and/or mating grooves can be flexibly influenced and optimized in a manner specific to the application. By way of example, the cross section of the grooves can be rectangular, with or without corner stiffening pieces (haunches), tunnel-shaped or trapezoidal. The cross section of the grooves and mating grooves can be the same or different. In addition, the grooves and/or mating grooves can be introduced into the respective surface of the main body with different widths and spacings. By way of example, it is possible to manufacture the grooves wider than their respective spacing, in order thus to ensure a high degree of water mobility combined with a low weight per unit area of the plastic drain sheet.

The grooves and mating grooves cross one another. Expressed differently, the grooves run in the sheet plane at a finite angle to the mating grooves. By way of example, the angle can be between 200 and 160°, in particular between 450 and 135°, in particular between 80° and 100°, preferably approximately 90°. At the crossing points, the grooves and mating grooves overlap in the direction of the sheet plane of the main body.

Providing the crossing points does not mean, however, that the grooves and mating grooves also have an overlap at the crossing points perpendicular to the sheet plane, that is to say in the direction of the sheet thickness, i.e. that the total of the depths of the grooves and mating grooves is greater than the sheet thickness of the main body. In fact, the depths of the grooves and/or the mating grooves, i.e. the dimension thereof perpendicular to the sheet plane, can also have a flexible configuration. By way of example, each of the grooves and/or the mating grooves can have a depth which is between 10% and 90% of the sheet thickness. The depth of the grooves and/or the mating grooves can be selected to be constant. As an alternative, the depth of the grooves and/or mating grooves can periodically alternate. By way of example, each second groove and each third mating groove can have a depth of respectively 50% of the sheet thickness, whereas the remaining grooves and/or mating grooves can have a smaller depth.

Apart from forming the crossing points, the grooves and/or mating grooves can run in any desired directions within the sheet plane. The grooves preferably run parallel to one another. The mating grooves also preferably run parallel to one another.

A method configured such that the main body is extruded, in particular by means of a slit die extruder, is flexible and cost-effective. The main body can be extruded with variably settable base sheet thicknesses. The extrusion of the main body also has the advantage that the main body and thus the plastic drain sheet can be manufactured with any desired length. By way of example, plastic drain sheets with a length of more than 10 m, in particular more than 50 m, in particular more than 100 m, in particular more than 200 m can be manufactured.

The preferred use of a slit die extruder allows the manufacture of wider plastic drain sheets with a width of for example between 2 m and 8 m. The width of the plastic drain sheet is in particular at least 4 m, in particular at least 6 m, in particular up to 8 m. The width of the plastic drain sheet is only delimited by the width of the slit die extruder. In addition, it is possible to change the width of the extruded plastic drain sheet in a targeted manner by further manufacturing steps. The width of the plastic drain sheet can thus be reduced by stretching the main body, for example by way of a smoothing calender. As an alternative, extending of the main body to increase the width is also possible.

The extrusion additionally allows for the main body to be provided with a consistent quality. In particular, the extrusion offers the possibility of increased flexibility in the selection of the material to be used for the main body. A very wide variety of plastics and plastic mixtures can thus be used. A variety of materials can also be bonded to the main body by co-extrusion.

The extrusion of the main body also has the advantage that further components of the plastic drain sheet can be provided together with the main body. The main body is particularly preferably provided together with a reinforcing structure. For this purpose, continuous yarns can be provided and introduced into the main body when it is being extruded. In this way, it is possible to embed continuous yarns into the main body in the longitudinal direction over the entire length of said main body. The continuous yarns allow a uniaxial reinforcement of the main body. Yarns which can be used for this purpose are in particular multi-filament yarns, for example multifilament yarns consisting of polyethylene terephthalate (PET) or polyvinyl alcohol (PVAL). As an alternative, other yarns, for example glass fibers, basalt fibers and/or steel fibers, can also be embedded into the main body during the extrusion.

A method configured such that the main body comprises at least one of the following materials: polyethylene (PE), polypropylene (PP), polyamide (PA), polystyrene (PS), acrylonitrile butadiene styrene copolymer (ABS), wood-plastic composite material (WPC), biopolymers, polyvinyl chloride (PVC) and polyethylene terephthalate (PET), is flexible in the selection of material. Polyethylene (PE), polypropylene (PP), polyamide (PA), polystyrene (PS), acrylonitrile butadiene styrene copolymer (ABS), wood-plastic composite material (WPC), biopolymers, polyvinyl chloride (PVC) and/or polyethylene terephthalate (PET) have proven to be particularly suitable for producing plastic drain sheets. These materials are recyclable, resistant to aging, weather and chemicals, and have a low creep behavior. In addition, all of these materials are suitable for the extrusion. The use of polyethylene, in particular in the forms of PE-LLD, PE 80, PE 100, PE 100-RC, PEEL, PE-MD and/or PE-HD, is particularly preferred. In addition, the method makes it possible to process all of the above-mentioned materials both as new material and as recycled material (re-work material), reclaimed material (post-industrial material (PIM)) and/or recyclate (post-consumer material (PCM)). This enables the plastic drain sheet to be manufactured in a cost-effective and resource-conserving manner.

The suitable material or the suitable mixture of these materials can be selected depending on the requirements for the plastic drain sheet. In addition, fillers, in particular inert fillers, can be added to the materials used. Examples of suitable fillers are rock flour, wood flour, biopolymers and/or short fibers.

When using these preferred materials, the plastic drain sheet can have a weight per unit area of between 1 500 g/m² and 18 000 g/m². This has the advantage that the plastic drain sheet has a low weight relative to its size and is easy to transport. The weight per unit area is determined in accordance with DIN EN ISO 9864.

A method configured such that the grooves are introduced, in particular formed in, into the first surface of the main body in such a way that said grooves run in a longitudinal direction of the main body or perpendicular thereto, is efficient and easy to implement. By way of example, the grooves can be embossed in the longitudinal direction or perpendicular thereto by means of suitable embossing rolls of a smoothing calender. For the case in which the main body is extruded, the longitudinal direction corresponds to the machine direction (MD). In this case, the grooves are particularly preferably formed into the first surface of the main body parallel to the longitudinal direction, since said grooves then cover the entire length of the plastic drain sheet. The grooves can be formed in directly during the extrusion of the main body in that the extruder has a correspondingly formed dispensing slot or extruder slot. The grooves can then be formed in together with the provision of the main body.

The mating grooves are preferably formed into the second surface of the main body parallel to the transverse direction. The grooves and the mating grooves particularly preferably run perpendicularly, i.e. at an angle of approximately 90°, with respect to one another.

A method configured such that the grooves are introduced in the direction perpendicular to the first surface with a depth $d_1$ and the mating grooves are introduced in the direction perpendicular to the second surface with a depth $d_2$, wherein the sum of $d_1$ and $d_2$ is greater than or equal to a sheet thickness of the main body, is efficient. In particular, the grooves are formed in, in particular embossed, in the direction perpendicular to the first surface with a depth $d_1$ and the mating grooves are formed in, in particular embossed, in the direction perpendicular to the second surface with a depth $d_2$. When the depth $d_1$ of the grooves and the depth $d_2$ of the mating grooves together is greater than or equal to the sheet thickness of the main body, it is possible to form the through-openings purely by virtue of the introduction, in particular forming in, of the grooves and the mating grooves. Advantageously, after being introduced, the grooves and mating grooves have the depths $d_1$ and/or $d_2$ required for forming through-openings. Further method steps for forming the through-openings are not necessary. In addition, a plastic drain sheet manufactured in this way has the advantage of a high water discharge capability. The sum of $d_1$ and $d_2$ is particularly preferably greater than the sheet thickness of the main body. In this case, the plastic drain sheet has high stability combined with a high water discharge capability.

A method configured such that the through-openings are introduced pneumatically, hydraulically and/or mechanically, ensures a high degree of water permeability perpendicular to the sheet plane. The pneumatic, hydraulic and/or mechanical introduction of the through-openings ensures that the main body is perforated irrespective of the depth $d_1$ of the grooves and the depth $d_2$ of the mating grooves. The through-openings can be introduced, for example, by compressed air, water blasting and/or by piercing and/or making holes in the material of the main body that remains in the region of the crossing points of the grooves and mating grooves. The use of compressed air has proven to be suitable in particular whenever only one thin, water-impermeable material layer is present after the grooves and/or the mating grooves have been introduced, in particular formed in.

A method configured such that a surface profiling is created on at least one of the surfaces of the main body in regions between the grooves and/or the mating grooves, makes it possible for the plastic drain sheet produced to have a particularly high contact shear strength. Surface profilings are preferably created on both surfaces in regions between the grooves and/or the mating grooves. The surface profiling can be embossed particularly easily using correspondingly profiled groove and/or mating-groove embossing rolls when the grooves and/or mating grooves are being embossed into the surfaces of the main body. As an alternative, specific profile embossing rolls which are formed for embossing the surface profiling can also be provided.

The surface profiling is in particular a microprofiling. The microprofiling can have a height of between 0.1 mm and 1.1 mm. The height of the microprofiling can be measured as what is known as an asperity height in accordance with ASTM D7466. The microprofiling can have any desired shaping. What are known as spikes and/or straight-line elevations have proven to be particularly suitable.

A method configured such that at least one of the surfaces of the main body is notched, ensures the manufacture of plastic drain sheets which can be stored and transported particularly easily. On account of the notching, the plastic drain sheet can be rolled up onto rolls, in particular rolls with a small diameter, particularly easily. A stowage space required for storage and transport is reduced.

The notching can take place without material removal, for example by virtue of incisions into the main body. The notching particularly preferably takes place in regions between the grooves and/or the mating grooves. A notching which takes place parallel or perpendicular to the longitudinal direction is suitable in particular. By way of example, the notching runs parallel to the grooves and/or mating grooves on the respective other surface. The notching particularly preferably runs parallel to the transverse direction of the plastic drain sheet on that one of the two surfaces which comes to lie on the outer side of the winding when the plastic drain sheet is being wound up. The section modulus of the cross section in the winding direction is reduced by virtue of the notching. The bending moment to be applied is therefore smaller and the plastic drain sheet can be wound up with smaller winding radii. On account of the notching in the transverse direction, the plastic drain sheet is more flexible in the longitudinal direction.

The notching is in particular introduced into the main body in addition to the grooves and the mating grooves. As an alternative, the notching can serve for introducing the grooves and/or mating grooves. By way of example, the second surface can be notched for the purpose of introducing the mating grooves. In order to form the mating grooves, the notched main body is stretched in particular in the direction perpendicular to the notching. The stretching makes it possible to open the notches and to form the mating grooves.

The through-openings between the grooves and the opening mating grooves are preferably also formed by the stretching. The notching preferably runs in the transverse direction of the main body. The stretching takes place in particular in the longitudinal direction, for example by virtue of an elevated drawing-off speed of a downstream smoothing calender.

In a preferred variant, the grooves are introduced, in particular formed in, in particular embossed, in the longitudinal direction of the main body with a depth $d_1$. The second surface can be notched in the transverse direction. The notching preferably has a depth $d_2$, which corresponds to at least the difference between the sheet thickness of the main body and the depth $d_1$ of the grooves. As a result of the notching and subsequent slight stretching, an opening in the sheet provided previously with grooves in the longitudinal direction is thus easily possible. In particular, the plastic drain sheet is permeable at throughopenings, which are formed on account of the stretching, perpendicular to the plane of said plastic drain sheet. On account of the opening mating grooves, a permeability in the transverse direction in the plane of the second surface is preferably created.

A method configured such that the grooves and/or mating grooves are formed in with a mean surface roughness in accordance with DIN 4768 part 1 of between 0.2 µm and 0.7 µm, allows for the manufacture of a plastic drain sheet with a particularly high degree of water mobility. A corresponding mean surface roughness in the region of the grooves and/or the mating grooves makes it possible to create continuous flow channels. The grooves and/or mating grooves in the micro range in particular do not have any unevennesses, such as for example notches. The regions with a corresponding mean surface roughness have a substantially smooth surface. The advantageous surface roughness of the grooves and/or mating grooves can be realized, for example, by the use of corresponding embossing rolls, i.e. embossing rolls having this surface roughness, to emboss the grooves and/or mating grooves into the respective surfaces of the mating grooves of the main body.

A method configured such that a cover layer is applied to at least one of the surfaces of the main body, broadens the spectrum of application of the plastic drain sheet to be produced. The plastic drain sheet can be used as a geocomposite material. A respective cover layer is preferably applied to the two surfaces of the main body. Geotextiles, in particular PP nonwoven materials, PET nonwoven materials and/or PE nonwoven materials in the form of filter layers, have proven suitable in particular as cover layers. The cover layer can be bonded to the respective surface of the main body thermally or by means of an adhesive, in particular a hotmelt adhesive.

A further object of the invention is to provide an improved plastic drain sheet. The plastic drain sheet provided is intended in particular to have high stability combined with a high water discharge capability.

Said object may be achieved by a plastic drain sheet produced according to a method for manufacturing a plastic drain sheet according to the invention. The advantages of the plastic drain sheet become apparent from the above-described method used to produce it.

Said object may be additionally achieved by a plastic drain sheet, comprising
  a sheet-like main body having a first surface and a second surface, spaced apart from the first surface by a base sheet thickness of the main body,
  grooves introduced into the first surface of the main body,
  mating grooves introduced into the second surface of the main body, wherein the mating grooves and the grooves cross one another at crossing points, and
  through-openings between the grooves and the mating grooves in the region of the crossing points.

The plastic drain sheet has a sheet-like main body having a first surface and a second surface, spaced apart from the first surface by a sheet thickness of the main body. In addition, the plastic drain sheet comprises grooves introduced into the first surface of the main body and mating grooves introduced into the second surface of the main body, wherein the mating grooves and the grooves cross one another at crossing points. The grooves and/or mating grooves are preferably formed, in particular embossed, into the respective surface. In addition, through-openings between the grooves and the mating grooves are present at the crossing points. On account of the one-piece, sheet-like main body, the plastic drain sheet has high stability, as has already been described above in relation to the method. The plastic drain sheet can be manufactured easily and cost-effectively. It has a flexible structure, in particular a variable, freely selectable sheet thickness which is constant over the width. The forms, depths and/or arrangements of the grooves and/or mating grooves can also be selected freely.

A plastic drain sheet configured such that the grooves and/or mating grooves have a tunnel-shaped, rectangular or trapezoidal cross section, has high stability and a high and also adaptable water discharge capability. The form of the cross section of the grooves and/or the mating grooves makes possible a targeted distribution of the compressive and/or shear forces acting on the plastic drain sheet. In addition, the water mobility of the grooves and/or the mating grooves can be adapted by virtue of their cross-sectional form.

A plastic drain sheet configured such that the main body has a width of between 2 m and 8 m, is suitable for large-area applications. The plastic drain sheet preferably has a width of more than 4 m, in particular more than 6 m, in particular up to 8 m.

A plastic drain sheet comprising a mean surface roughness in accordance with DIN 4768, Part 1 of between 0.2 μm and 0.7 μm, at least in the region of the grooves and/or mating grooves, has a particularly high water discharge capability. The low mean surface roughness in the region of the grooves and/or the mating grooves has the effect that no unevennesses are present in the grooves and/or mating grooves in the micro range. In this way, continuous flow channels are ensured.

A plastic drain sheet comprising a surface profiling on at least one of the surfaces of the main body in the region between the grooves and/or between the mating grooves, has a high contact shear strength. The surface profiling is in particular in the form of a microprofiling. The height of the microprofiling can be measured for example as what is known as an asperity height in accordance with ASTM D7466. The microprofiling preferably has a height of between 0.1 mm and 1.1 mm. The microprofiling can particularly preferably have what are known as spikes and/or straight-line elevations.

The plastic drain sheet comprising a weight per unit area of between 1 500 g/m² and 18 000 g/m², has a low weight combined with a high internal shear strength. As a result, the plastic drain sheet is in particular easy to transport and simple to install.

A plastic drain sheet configured such that the main body comprises at least one of the following materials: polyethylene (PE), polypropylene (PP), polyamide (PA), polystyrene (PS), acrylonitrile butadiene styrene copolymer (ABS), wood-plastic composite material (WPC), biopolymers, polyvinyl chloride (PVC) and polyethylene terephthalate (PET), can be used flexibly and is robust. The suitable material and/or the suitable material mixture, optionally with admixed fillers, can be selected depending on requirements. The plastic drain sheet is resistant to chemicals and resistant to aging and weather. In addition, the plastic drain sheet is recyclable.

The plastic drain sheet is particularly preferably manufactured from recycled material (rework material), reclaimed material (post-industrial material) and/or recyclate (post-consumer material). A plastic drain sheet composed of materials of these types is cost-effective and conserves resources.

A plastic drain sheet comprising a cover layer on at least one of the surfaces of the main body, has a broad spectrum of application. The properties of the plastic drain sheet can be adapted even more effectively to the respective usage situation by the selection of suitable cover layers. Suitable cover layers are in particular geotextiles, particularly preferably PP nonwoven materials, PET nonwoven materials and/or PE nonwoven materials, which for example have been bonded to the main body thermally or by means of an adhesive, in particular a hotmelt adhesive. The plastic drain sheet particularly preferably has a respective cover layer on each surface of the main body.

A plastic drain sheet comprising at least one reinforcing structure embedded into the main body, is particularly stable and has a broad spectrum of application. The reinforcing structure makes it possible for the plastic drain sheet to absorb particularly large forces without impairing the water mobility of the plastic drain sheet. In addition, the plastic drain sheet can be used for reinforcement purposes without external reinforcing elements, such as for example geogrids, being required.

The at least one reinforcing structure preferably extends in the longitudinal direction over the entire length of the main body and thus over the entire length of the plastic drain sheet. Corresponding reinforcing structures are particularly preferably arranged between in each case two grooves running in the longitudinal direction. In this way, a particularly stable uniaxial reinforcement of the plastic drain sheet is realized. In principle, the entire volume of the main body between the longitudinal grooves is available for the reinforcing structure.

The reinforcing structure can comprise yarns, in particular plastics yarns, preferably multifilament yarns, for example consisting of polyethylene terephthalate (PET) and/or polyvinyl alcohol (PVAL). As an alternative and/or in addition, the at least one reinforcing structure can also comprise glass fibers, basalt fibers and/or steel fibers.

The reinforcing structure is preferably embedded completely in the material of the main body. As a result, the reinforcing structure is protected from environmental influences. To manufacture the at least one reinforcing structure, continuous yarns composed of the material forming the reinforcing structure can be provided and embedded into the molding compound forming the main body. This particularly preferably takes place during extrusion of the main body. In this respect, the yarns can be introduced easily into the extruded main body at the suitable position. The at least one reinforcing structure and the main body are manufactured integrally.

Further features, advantages and details of the invention will become apparent from the following exemplary embodiments and the associated figures.

DESCRIPTION OF THE PREFERRED EMBODIMENTS

Figure 1:
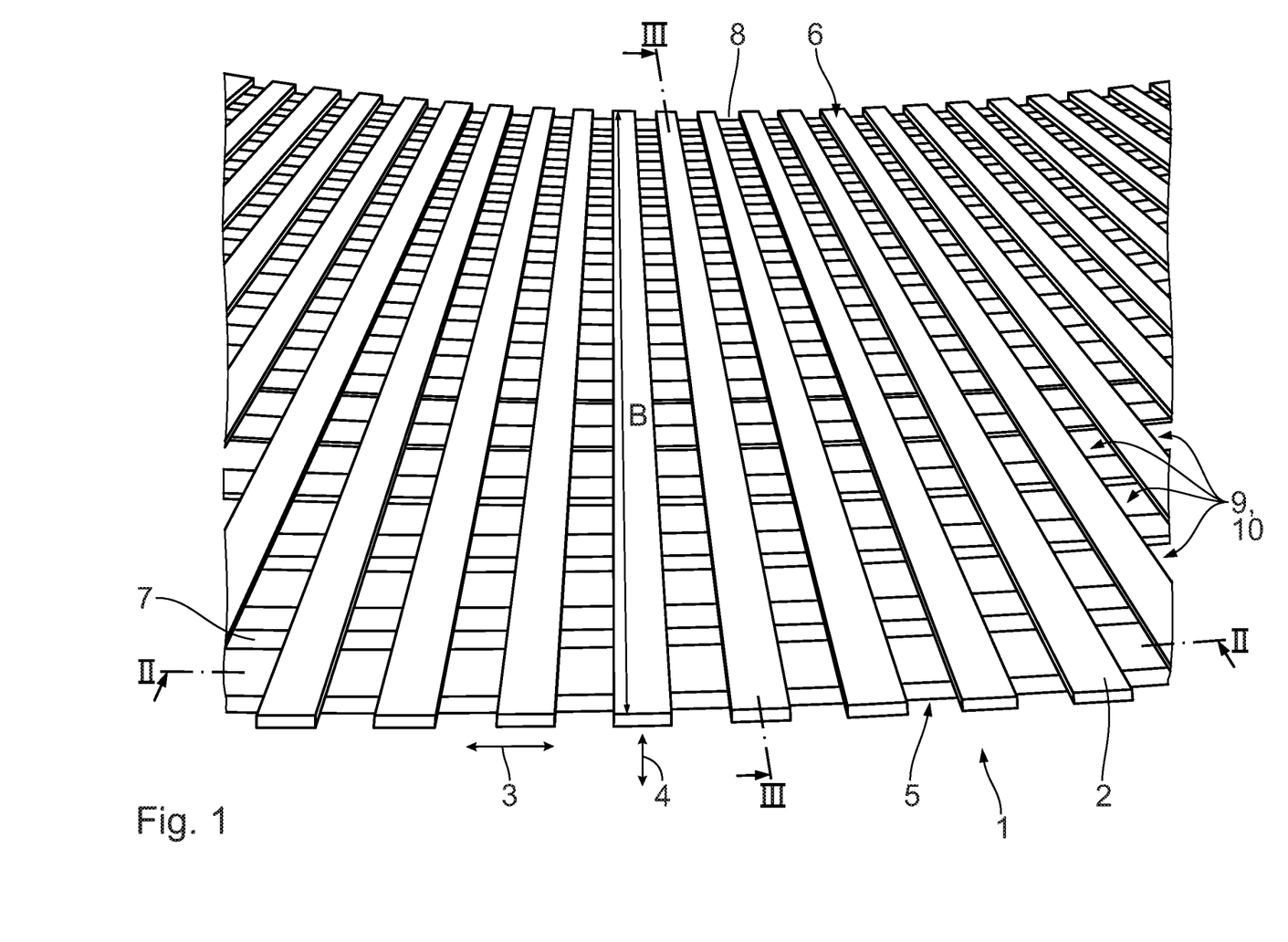
FIG. 1 shows a perspective view of a plastic drain sheet.
Figure 2:
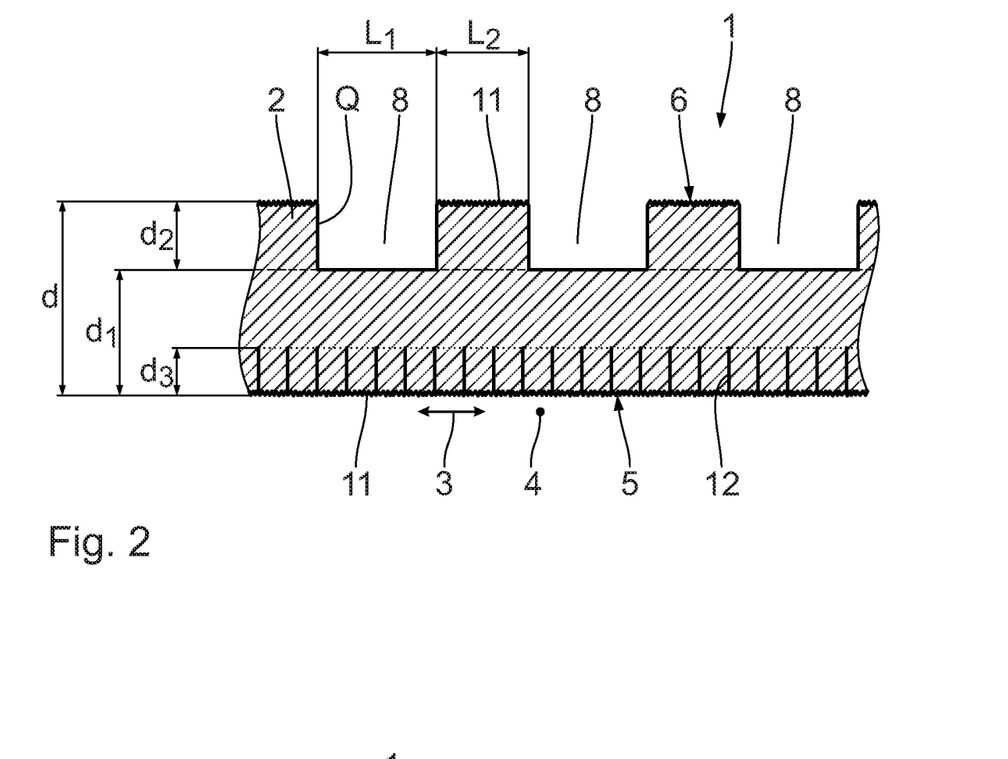
FIG. 2 shows a longitudinal section through the plastic drain sheet according to FIG. 1 along the cutting edge II-II.
Figure 3:
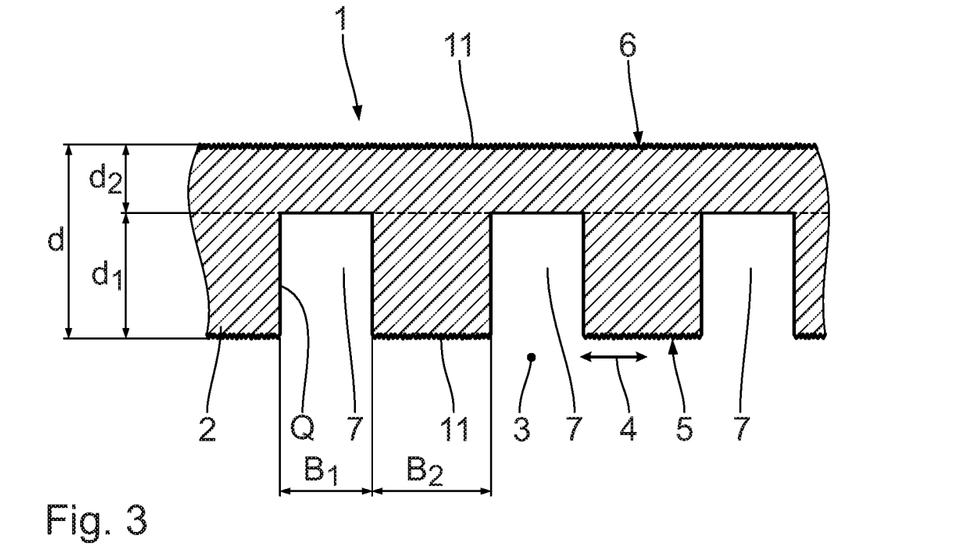
FIG. 3 shows a cross section through the plastic drain sheet according to FIG. 1 along the cutting edge III-III.

FIGS. 1 to 3 show an exemplary embodiment of a plastic drain sheet. The plastic drain sheet 1 has a sheet-like main body 2. The sheet-like main body 2 extends in a longitudinal direction 3 and a transverse direction 4 running perpendicular thereto. Only part of the plastic drain sheet 1 is shown in FIG. 1. The plastic drain sheet 1 extends in the longitudinal direction 3 beyond the part shown in FIG. 1. FIG. 2 shows a longitudinal section through the plastic drain sheet 1 in the longitudinal direction 3 along the cutting edge II-II. FIG. 3 shows a cross section through the plastic drain sheet 1 in the transverse direction 4 along the cutting edge III-III.

The plastic drain sheet 1 has a length in the longitudinal direction 3 and a width B in the transverse direction 4. The longitudinal direction 3 and the transverse direction 4 span a sheet plane. Perpendicular to the sheet plane, i.e. in a direction perpendicular to the longitudinal direction 3 and to the transverse direction 4, the main body 2 of the plastic drain sheet 1 has a constant sheet thickness d. The length and the width B are greater than the sheet thickness d by a multiple. The plastic drain sheet 1 has a width B of 2 m. Greater widths B of up to 8 m and over are also possible. In principle, the length is unrestricted and can exceed the width B. By way of example, lengths of over 10 m, in particular over 50 m, in particular over 100 m, in particular over 200 m are possible. The sheet thickness d is typically between 4 mm and 10 mm.

The main body 2 has a first surface 5 which constitutes the bottom side of the plastic drain sheet 1 in FIGS. 1 to 3. In addition, the main body 2 has a second surface 6 which is spaced apart from the first surface 5 by the sheet thickness d and is shown in the figures as the top side of the plastic drain sheet 1. Grooves 7 are formed into the first surface 5. The grooves 7 run parallel to one another in the longitudinal direction 3 of the plastic drain sheet. Mating grooves 8, which run parallel to one another in the transverse direction 4, are formed into the second surface 6 of the main body 2. The grooves 7 and the mating grooves 8 thus run perpendicular to one another and cross one another at crossing points 9. Through-openings 10 between the grooves 7 and the mating grooves 8 are formed in the region of the crossing points 9.

The grooves 7 and the mating grooves 8 constitute flow channels for water which is to be discharged through the plastic drain sheet 1. A water permeability of the plastic drain sheet 1 perpendicular to its sheet plane is ensured by the through-openings 10. The configuration of the plastic drain sheet 1 as a sheet-like main body 2 in which grooves 7 and mating grooves 8 have been formed ensures good water mobility combined with high stability, in particular high compressive strength, high internal shear strength, high contact shear strength and high dimensional stability. The plastic drain sheet has a high water discharge capability over its entire service life.

The grooves 7 and the mating grooves 8 have a cross section Q. The cross section Q is rectangular in each case. The grooves 7 have a regular spacing $B_2$ and a width $B_1$ in the transverse direction 4. The mating grooves 8 have a width $L_1$ and a regular spacing $L_2$ in the longitudinal direction 3. The spacings $B_2$ and $L_2$ can be between 2 mm and 16 mm, in particular between 3 mm and 10 mm. The widths $B_1$ and $L_1$ are for example between 2 mm and 12 mm, in particular between 3 mm and 10 mm.

The rectangular cross section Q of the grooves 7 and the mating grooves 8 ensures a high water discharge capability. At the same time, the main body 2 has high stability.

The grooves 7 are formed into the first surface 5 with a depth $d_1$ perpendicular to the sheet plane of the main body 2. The mating grooves 8 are formed into the second surface 6 with a depth $d_2$ perpendicular to the sheet plane. The depths $d_1$ and $d_2$ are dimensioned in such a way that the sum thereof is equal to the sheet thickness d: $d_1+d_2=d$. This has the effect that the grooves 7 overlap the mating grooves 8 in the region of the crossing points 9 perpendicular to the sheet plane, and therefore the through-openings 10 are obtained.

In order to further increase the water mobility of the grooves 7 and the mating grooves 8, the edge faces thereof formed by the main body 2 have a mean surface roughness in accordance with DIN 4768, Part 1 of between 0.2 μm and 0.7 μm. This ensures continuous flow channels in the grooves 7 and mating grooves 8. Unnevennesses in the micro range are avoided.

In regions between the grooves 7 and/or the mating grooves 8, the first surface 5 and the second surface 6 have a surface profiling in the form of a microprofiling 11. The microprofiling 11 has what are known as spikes and/or straight-line elevations with a height of between 0.1 mm and 1.1. mm. The height of the microprofiling 11 is measured as an asperity height in accordance with ASTM D7466. The effect of the microprofiling 11 is an improved contact shear strength of the plastic drain sheet 1.

The main body 2 of the plastic drain sheet 1 comprises polyethylene (PE). PE-LLD, PE 80, PE 100, PE 100-RC, PE-EL, PE-MD or PE-HD are particularly suitable. Alternative materials for the main body 2 of the plastic drain sheet 1 are polypropylene (PP), polyamide (PA), polystyrene (PS), acrylonitrile butadiene styrene copolymer (ABS), wood-plastic composite materials (WPC), biopolymers, polyvinyl chloride (PVC) and/or polyethylene terephthalate (PET). In some exemplary embodiments, the main body 2 is manufactured from recycled material (re-work material), reclaimed material (post-industrial material) and/or recyclate (post-consumer material). In yet other exemplary embodiments, fillers, in particular inert fillers, are also admixed with the main body 2. Examples of this are rock flour, wood flour, biopolymers and short fibers. The admixing of fillers makes it possible to adapt the material properties of the main body 2 of the plastic drain sheet 1 even better to the requirements to be met.

The plastic drain sheet 1 has a weight per unit area of between 1 500 g/m² and 18 000 g/m². The weight per unit area of the plastic drain sheet is determined in accordance with DIN EN ISO 9864. The plastic drain sheet 1 has a low weight with respect to its dimensions and can thus be transported easily.

The transportability is increased further as a result of the first surface 5 being notched. The notches 12 run parallel to one another in the transverse direction 4. The notches 12 run parallel to the mating grooves 8. The notches 12 are incisions in the main body 2.

The notches 12 have a depth $d_3$ perpendicular to the sheet plane that is less than the sheet thickness d minus the depth $d_2$ of the mating grooves 8: $d-d_2>d_3$. The notching of the main body 2 with the aid of the notches 12 improves the rolling up of the plastic drain sheet onto transport rolls.

The plastic drain sheet 1 can be used in its form shown in FIGS. 1 to 3. In addition, the plastic drain sheet 1 can be supplemented by cover layers on the surfaces 5, 6. Suitable cover layers are geotextiles, in particular composed of PP nonwoven materials, which are thermally bonded to the plastic drain sheet 1.

Figure 4:
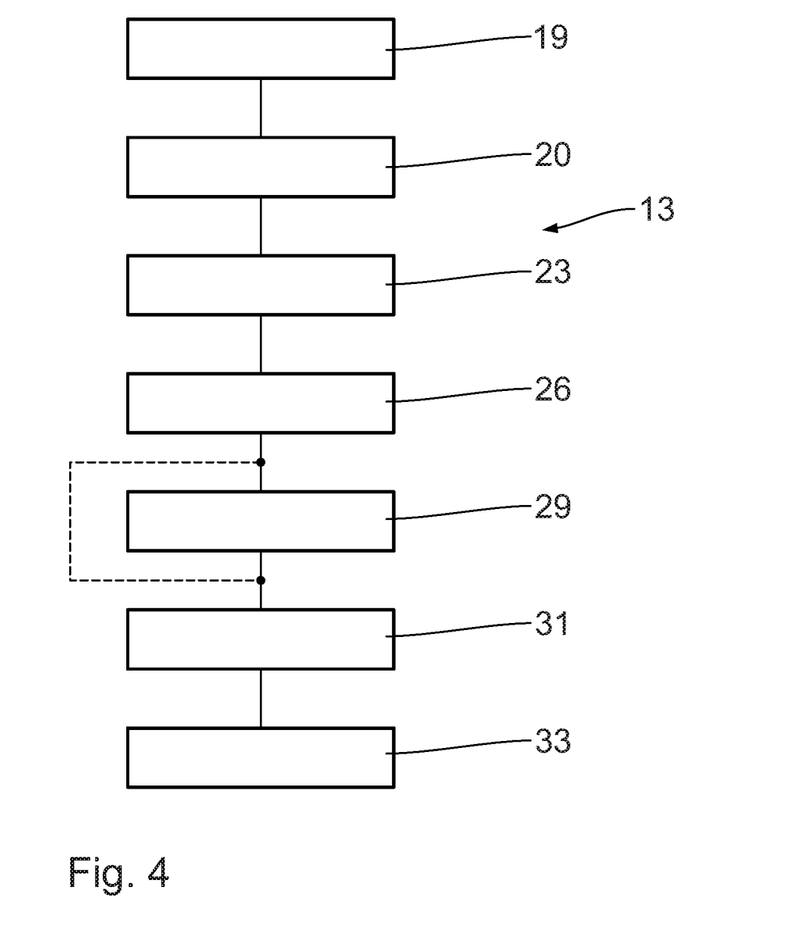
FIG. 4 shows a schematic method sequence for manufacturing a plastic drain sheet.

The manufacture of the plastic drain sheet 1 will be explained below with reference to FIGS. 4 to 6. FIG. 4 shows a schematic method sequence of a suitable manufacturing method 13. The manufacturing method 13 is divided into functional manufacturing steps. The individual manufacturing steps thus do not constitute a strictly chronological sequence. Rather, the sequence of the manufacturing steps over time is determined by the manufacturing apparatus used for carrying out the manufacturing method 13.

Figure 5:
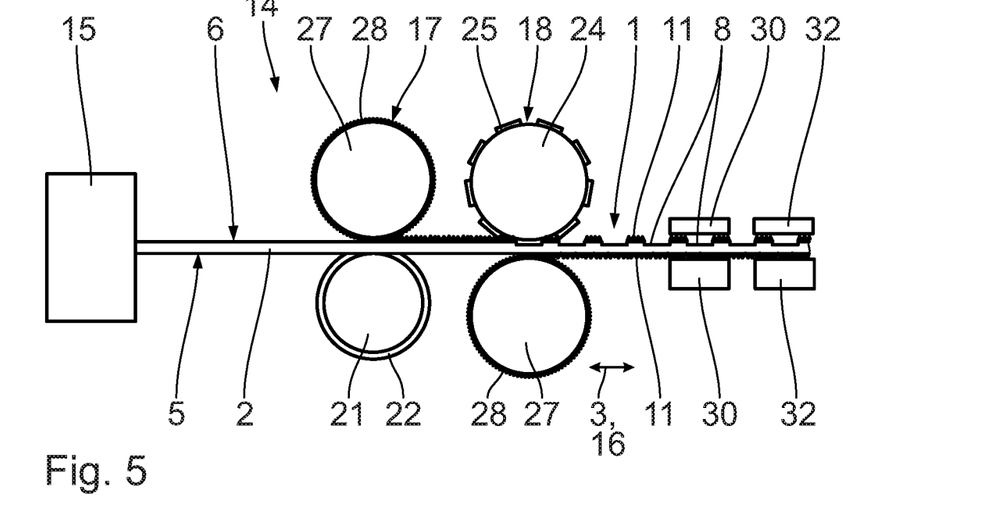
FIG. 5 shows a schematic illustration of a manufacturing apparatus for manufacturing a plastic drain sheet.

FIG. 5 schematically shows an exemplary embodiment of a manufacturing apparatus 14 which can be used for carrying out the manufacturing method 13. The manufacturing apparatus 14 substantially comprises a slit die extruder 15 and two smoothing calenders 17, 18 which follow one another in the machine direction 16.

In a preparing step 19, the sheet-like main body 2 is extruded using the slit die extruder 15. The width B of the main body 2 and therefore of the plastic drain sheet 1 is thus established by the width of the slit die extruder 15. The main body 2 and the plastic drain sheet 1 can be created in any desired length, in particular can be created continuously, using the slit die extruder 15. The slit die extruder 15 thus also predefines the longitudinal direction 3, which corresponds to the machine direction 16, and the transverse direction 4 of the plastic drain sheet 1. Using the slit die extruder 15, all of the materials which can be used as stated above for the main body 2 can be processed individually or in combination in the co-extrusion method.

In the preparing step 19, the sheet-like main body 2 is extruded with a base sheet thickness.

In a groove forming-in step 20, the grooves 7 are formed into the first surface 5 of the main body 2. For this purpose, the first smoothing calender 17 has a groove embossing roll 21 with grooving tools 22 adapted to the cross section Q of the grooves 7. The grooves 7 are embossed into the main body 2 using the grooving tools 22 of the groove embossing roll 21. The grooving tools 22 have a mean surface roughness which corresponds to the mean surface roughness of the edge faces of the grooves 7.

In a mating-groove forming-in step 23, the mating grooves 8 are formed into the second surface 6 of the main body 2. In the manufacturing apparatus 14, this takes place using a mating-groove embossing roll 24 of the second smoothing calender 18. The mating-groove embossing roll 24 has mating-grooving tools 25, the cross section of which corresponds to the cross section Q of the mating grooves 8. The mating-grooving tools 25 have a mean surface roughness which corresponds to the mean surface roughness of the mating grooves 8.

During the embossing of the grooves 7 and the mating grooves 8 in the groove forming-in step 20 and in the mating-groove forming-in step 23, respectively, the material of the main body 2 that was originally located in the region of the grooves 7 and mating grooves 8, respectively, is displaced. On account of this material displacement, the thickness of the main body 2 is increased over the base sheet thickness with which the main body 2 was extruded in the preparing step 19. After the grooves 7 and the mating grooves 8 have been embossed, the main body 2 has the sheet thickness d, as was described above with reference to FIGS. 1 to 3.

The microprofiling 11 is created in a profiling step 26. In the manufacturing apparatus 14, the profiling step is carried out using profile embossing rolls 27. For this purpose, the profile embossing rolls 27 have a surface profiling 28 which corresponds to the microprofiling 11. The microprofiling 11 of the second surface 6 is created using the profile embossing roll 27, which is part of the first smoothing calender 17. The microprofiling 11 of the first surface 5 is created using the profile embossing roll 27, which is part of the second smoothing calender 18.

The groove forming-in step 20, the mating-groove forming-in step 23 and the profiling step 26 are carried out as long as the material forming the main body 2 is still warm and correspondingly moldable. The further manufacturing steps can also be carried out after the material has been cooled down.

For the case in which the through-openings 10 are not formed solely by virtue of the embossing of the grooves 7 and the mating grooves 8, respectively, in the groove forming-in step 20 and the mating-groove forming-in step 23, the manufacturing method 13 can comprise an optional perforating step 29. Material residues remaining in the region of the crossing points 9 can then be severed and/or removed in the perforating step 29. This can take place for example mechanically by means of making holes or piercing, or pneumatically with compressed air. As an alternative, the through-openings 10 can also be introduced hydraulically by means of water blasting. A correspondingly designed perforating apparatus 30 adjoins the smoothing calenders 17, 18 in the machine direction 16 in the manufacturing apparatus 14.

In a notching step 31, the first surface 5 of the main body 2 is notched. The notches 12 are introduced using the notching apparatus 32. As an alternative to providing an extra notching apparatus 32, corresponding notching tools can also be provided at the profile embossing rolls 27.

An optional supplementing step 33 follows the above-mentioned manufacturing steps. In the supplementing step 33, cover layers, for example in the form of PP nonwoven materials, can be applied to the surfaces 5, 6 of the main body 2. A laminating apparatus which can be used for the supplementing step 33 is not shown in the case of the manufacturing apparatus 14 for the sake of clarity.

In addition to the manufacturing apparatus 14, further manufacturing apparatuses for carrying out the manufacturing method 13 can also be used. In further exemplary embodiments, not illustrated, of a manufacturing apparatus for the plastic drain sheet 1, the embossing rolls can be arranged differently. By way of example, it is possible to combine the groove embossing rolls and the mating-groove embossing rolls in a first smoothing calender. The two profile embossing rolls can then be positioned one on top of the other in a second, downstream smoothing calender. In yet other exemplary embodiments, not illustrated, the groove embossing rolls and the mating-groove embossing rolls comprise in each case a surface profiling between the respective (mating-)grooving tools. These groove embossing rolls and the mating groove embossing rolls are in this case combined into a single smoothing calender, which ensures the embossing of the grooves 7, the mating grooves 8 and the microprofiling 11. A second smoothing calender is correspondingly not necessary.

Figure 6:
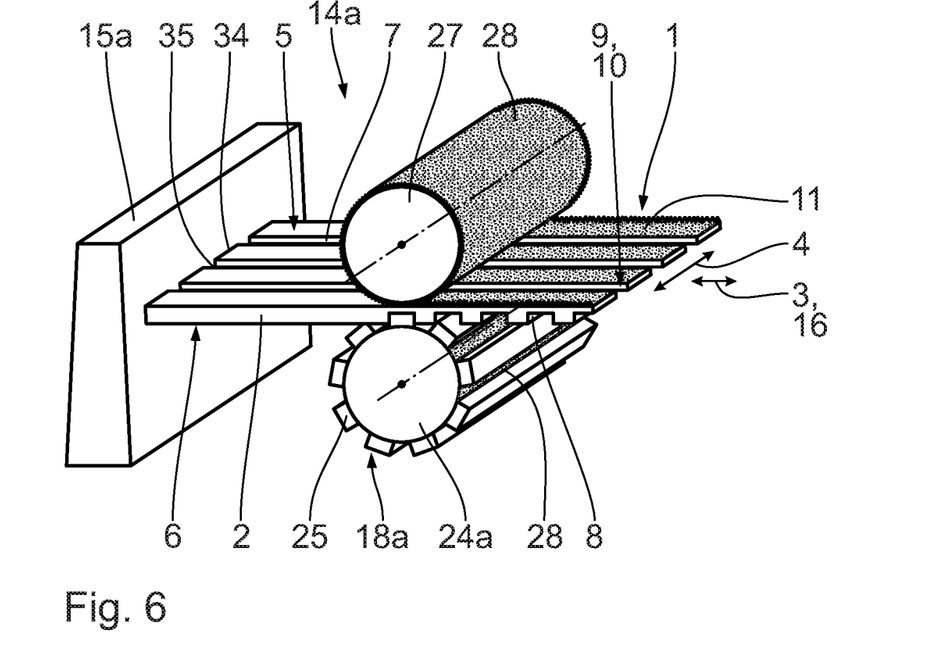
FIG. 6 shows a schematic illustration of a further manufacturing apparatus for manufacturing a plastic drain sheet.

FIG. 6 shows a further exemplary embodiment of a manufacturing apparatus 14a for manufacturing the plastic drain sheet 1. Components which have already been described in conjunction with the manufacturing apparatus 14 according to FIG. 5 bear the same reference signs. Structurally different but functionally similar parts are given the same reference signs with an appended a.

In the illustration of the manufacturing apparatus 14a, the first surface 5 of the plastic drain sheet 1 to be manufactured points upward, whereas the second surface 6 faces downward. The manufacturing apparatus 14a has a slit die extruder 15a. The slit die extruder 15a has an extruder slot 34 with projections 35. The form of the individual projections corresponds to the cross section Q of the grooves 7 in the first surface 5. During the extrusion of the main body 2 using the slit die extruder 15a, the grooves 7 are formed into the first surface 5 of the main body 2. In this context, the groove forming-in step 20 takes place simultaneously with the preparing step 19. Subsequent embossing of the grooves 7 in the main body 2 is not necessary. The manufacturing apparatus 14a accordingly does not have a first smoothing calender 17.

The single smoothing calender 18a of the manufacturing apparatus 14a has a profile embossing roll 27 and a mating-groove embossing roll 24a. The microprofiling 11 is created on the first surface 5 in regions between the grooves 7 using the profile embossing roll 27. The mating-groove embossing roll 24a comprises the mating-grooving tools 25, by means of which the mating grooves 8 are embossed into the second surface 6 of the main body 2. Between the mating-grooving tools 25, the mating-groove embossing roll 24a has a surface profiling 28, with the aid of which the microprofiling 11 is created on the second surface 6 in regions between the mating grooves 8.

Further components of the manufacturing apparatus 14a, such as for example a perforating apparatus or a notching apparatus, are similar to the corresponding components of the manufacturing apparatus 14. These components and an optionally provided laminating apparatus are not shown in FIG. 6 for the sake of clarity.

The manufacturing method 13 described here makes it possible to manufacture the plastic drain sheet 1 in a defined and uniform quality. In addition, the properties of the plastic drain sheet 1 can be adapted flexibly to the respective requirements. By way of example, the materials used can be varied. The cross section Q, the depths $d_1$, $d_2$ and the spacings $B_2$, $L_2$ between the grooves 7 and/or the mating grooves 8 can similarly be selected freely.

In the manufacturing method 13 described above, the width B of the plastic drain sheet 1 corresponds substantially to the width with which the main body 2 is extruded. In further embodiments of the method, it is however also possible to change the width B of the plastic drain sheet 1 in a targeted manner. In an exemplary embodiment of the manufacturing method, the extruded main body 2 can be gripped at its longitudinal edges running in the longitudinal direction 3 and be drawn out widthwise in the transverse direction 4. As a result, the width B of the main body 2 and thus of the plastic drain sheet 1 can be increased. The plastic drain sheet 1 can in particular have a width B which exceeds the width of the slit die extruder used to extrude the main body 2.

In a further exemplary embodiment of the manufacturing method, the plastic drain sheet 1 is stretched in the machine direction 16, i.e. in the longitudinal direction 3. This can take place, for example, in that a smoothing calender downstream of the extruder has a drawing-off speed which is elevated with respect to the conveying speed of the main body. The drawing-off speed is determined by the speed at which the surface and/or the embossing tools of the embossing rolls of the smoothing calender move along the circumference of the embossing roll. The conveying speed corresponds to the extrusion speed at which the main body 2 is extruded. The elevated drawing-off speed leads to the plastic drain sheet 1 being stretched in the machine direction 16. As a result, the width B of the plastic drain sheet 1 is reduced in favor of its length.

Further exemplary embodiments for manufacturing methods for manufacturing the plastic drain sheet 1 differ in terms of the methods by which the mating grooves 8 are introduced into the second surface 6. In an exemplary embodiment, firstly the grooves 7 are embossed into the first surface 5 with a depth $d_1$. After this, the second surface 6 is notched. The notching runs preferably in the transverse direction 4. The notching has a depth $d_2$, which corresponds to at least the difference between the sheet thickness d and the depth $d_1$ of the grooves 7: $d_2 \geq d - d_1$. After the notches have been introduced, the main body 2 is stretched in the machine direction 16, i.e. in the longitudinal direction 3. The stretching takes place in turn as a result of an elevated drawing-off speed of a downstream smoothing calender. As a result of the stretching, the notches are opened and form the mating grooves 8. At the same time, the through-openings 10 between the grooves 7 and the mating grooves 8 are opened.

Figure 7:
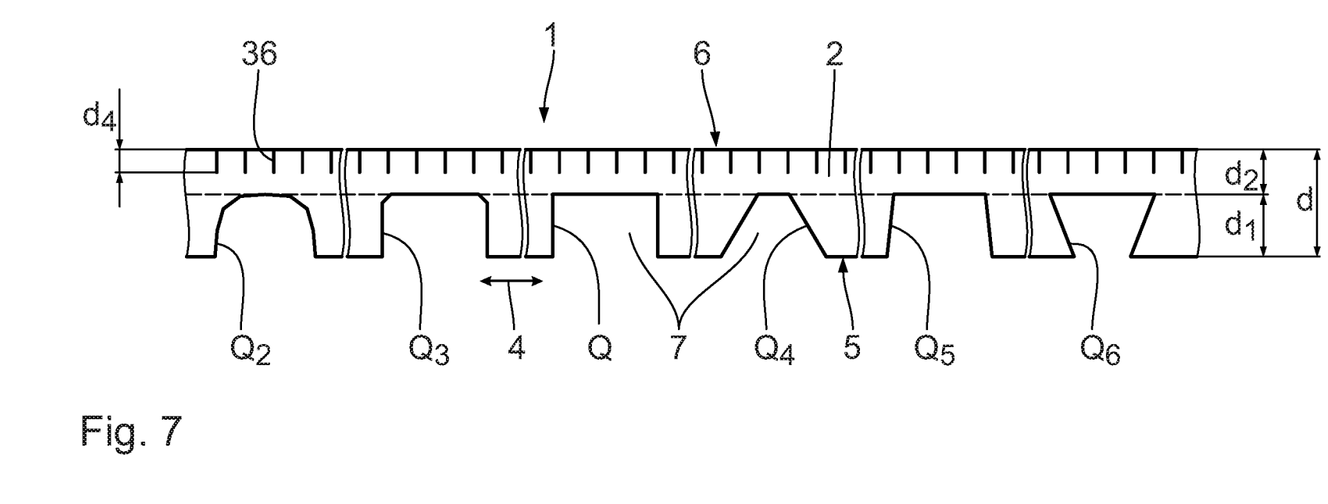
FIG. 7 shows a schematic illustration of alternative cross sections of the grooves of the plastic drain sheet.

FIG. 7 shows alternative cross-sectional forms for the grooves 7. Apart from the grooves 7 with a rectangular cross section Q, as have already been discussed above, grooves with a rectangular cross section $Q_3$ with corner stiffening pieces, called haunches, can also be provided. Further possible cross sections have a tunnel form ($Q_2$), a flat trapezoidal form ($Q_4$), a steep trapezoidal form ($Q_5$) or an undercut trapezoidal form ($Q_6$). Corresponding cross-sectional forms can of course also be provided for the mating grooves 8.

As is also clear from FIG. 7, notches 36 which run in the longitudinal direction 3 can also be provided on the second surface 6. The depth $d_4$ of the notches 36 is smaller than the sheet thickness d minus the depth $d_1$ of the grooves 7: $d - d_1 > d_4$.

In other exemplary embodiments, not illustrated, the grooves 7 and the mating grooves 8 have a changed arrangement. By way of example, it is possible for the mating grooves 8 to run not perpendicular to the longitudinal direction 3, that is to say in the transverse direction 4, but oblique thereto. In general, the grooves 7 and the mating grooves 8 can enclose an angle of between 200 and 160°.

In further exemplary embodiments, the sum of the depth $d_1$ of the grooves 7 and the depth $d_2$ of the mating grooves 8 does not correspond equally to the sheet thickness d. In general, the depths $d_1$, $d_2$ can each be between 10% and 90% of the sheet thickness d. For the case in which the sum of the depths $d_1$ and $d_2$ is less than the sheet thickness d, the through-openings 10 in the region of the crossing points 9 necessarily have to be introduced by means of the perforating step 29, for example by using a mandrel to pierce remaining material.

Figure 8:
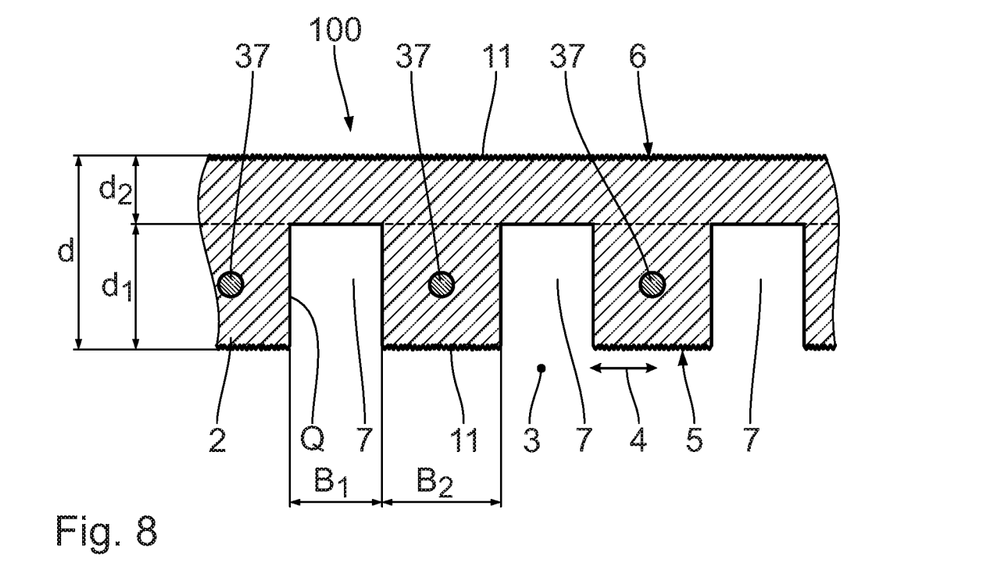
FIG. 8 shows a cross section through a further exemplary embodiment of a plastic drain sheet.

FIG. 8 shows a cross section through a further exemplary embodiment of a plastic drain sheet 100. Components which have already been explained in conjunction with the plastic drain sheet 1 according to FIGS. 1 to 7 bear the same reference signs.

The plastic drain sheet 100 differs from the plastic drain sheet 1 in that reinforcing structures 37 are embedded into its main body 2 between the grooves 7 running in the longitudinal direction 3. The reinforcing structures 37 are embedded into the main body 2 of the plastic drain sheet 100 around the full periphery. The reinforcing structures 37 extend in the longitudinal direction 3 over the entire length of the plastic drain sheet 100. As a result, a uniaxial reinforcement of the plastic drain sheet 100 is realized. The plastic drain sheet 100 can take up considerable forces in the longitudinal direction 3. As a result, the functionality and possible uses of the plastic drain sheet 100 are increased. The plastic drain sheet 100 can be used as reinforcement, without additional external reinforcing elements, such as for example geogrids, being necessary for this purpose.

The reinforcing structures 37 comprise plastic yarns in the form of multifilament yarns consisting of polyethylene terephthalate (PET) and/or polyvinyl alcohol (PVAL). In other exemplary embodiments, the reinforcing structures 37 comprise yarns composed of glass fibers, basalt fibers and/or steel fibers.

In further exemplary embodiments of the plastic drain sheet 100, a plurality of reinforcing structures 37 are embedded between in each case two longitudinal grooves 7.

The reinforcing structures 37 of the plastic drain sheet 100 can be introduced into the main body 2 in the manufacturing method described above. For this purpose, continuous yarns of the material forming the reinforcing structure 37 are provided and are inserted and embedded into the molding compound of the main body 2 when the main body 2 is being extruded in the preparing step 19.

The invention claimed is:

1. A method for manufacturing a plastic drain sheet, the method comprising the steps of:
   providing a sheet-like main body having a first surface and a second surface, spaced apart from the first surface by a base sheet thickness of the main body;
   introducing grooves into the first surface of the main body;
   introducing mating grooves into the second surface of the main body, wherein the mating grooves and the grooves cross one another at crossing points; and
   forming through-openings between the grooves and the mating grooves in the region of the crossing points to complete the plastic drain sheet, wherein notches are formed on the first surface by incisions into the main body in regions between the grooves.

2. The method as claimed in claim 1, wherein the main body is extruded by means of a slit die extruder.

3. The method as claimed in claim 1, wherein the main body comprises at least one of the following materials: polyethylene (PE), polypropylene (PP), polyamide (PA), polystyrene (PS), acrylonitrile butadiene styrene copolymer (ABS), wood-plastic composite material (WPC), biopolymers, polyvinyl chloride (PVC) and polyethylene terephthalate (PET).

4. The method as claimed in claim 1, wherein the grooves are introduced into the first surface of the main body in such a way that said grooves run one of in a longitudinal direction of the main body and perpendicular thereto.

5. The method as claimed in claim 1, wherein the grooves are introduced in the direction perpendicular to the first surface with a depth d1 and the mating grooves are introduced in the direction perpendicular to the second surface with a depth d2, wherein the sum of d1 and d2 is one of greater than and equal to a sheet thickness of the main body, the first surface being located opposite the second surface.

6. The method as claimed in claim 5, wherein the notches have a depth d3 perpendicular to the sheet plane, wherein the depth d3 is less than the sheet thickness of the main body minus the depth d2 of the mating grooves.

7. The method as claimed in claim 1, wherein the through-openings are introduced at least one of pneumatically, hydraulically and mechanically.

8. The method as claimed in claim 1, wherein a surface profiling is created on at least one of the surfaces of the main body in regions between at least one of the grooves and the mating grooves.

9. The method as claimed in claim 1, wherein at least one of the grooves and the mating grooves are formed in with a mean surface roughness in accordance with DIN 4768 part 1 of between 0.2 µm and 0.7 µm.

10. The method as claimed in claim 1, wherein a cover layer is applied to at least one of the surfaces of the main body.

11. The method as claimed in claim 1, wherein the notches run parallel to the mating grooves.

12. The method as claimed in claim 1, wherein the notches run parallel to a transverse direction of the plastic drain sheet.

13. The method as claimed in claim 1, wherein the mating notches are formed on the second surface by incisions in the main body in regions between the mating grooves.

14. A plastic drain sheet produced as claimed in claim 1.

15. A plastic drain sheet, comprising:
   a sheet-like main body having a first surface and a second surface, spaced apart from the first surface by a base sheet thickness of the main body;
   grooves introduced into the first surface of the main body;
   mating grooves introduced into the second surface of the main body, wherein the mating grooves and the grooves cross one another at crossing points; and
   through-openings between the grooves and the mating grooves in the region of the crossing points; and
   notches on the first surface, wherein the notches are formed by incisions into the main body in regions between the grooves.

16. The plastic drain sheet as claimed in claim 15, wherein at least one of the grooves and the mating grooves have one of a tunnel-shaped, a rectangular and a trapezoidal cross section.

17. The plastic drain sheet as claimed in claim 15, wherein the main body has a width of between 2 m and 8 m.

18. The plastic drain sheet as claimed in claim 15, comprising a mean surface roughness in accordance with DIN 4768, Part 1 of between 0.2 µm and 0.7 µm, at least in the region of at least one of the grooves and the mating grooves.

19. The plastic drain sheet as claimed in claim 15, comprising a surface profiling on at least one of the surfaces of the main body in the region between at least one of the grooves and the mating grooves.

20. The plastic drain sheet as claimed in claim 15, comprising a weight per unit area of between 1 500 g/m$^2$ and 18 000 g/m$^2$.

21. The plastic drain sheet as claimed in claim 15, wherein the main body comprises at least one of the following materials: polyethylene (PE), polypropylene (PP), polyamide (PA), polystyrene (PS), acrylonitrile butadiene styrene copolymer (ABS), wood-plastic composite material (WPC), biopolymers, polyvinyl chloride (PVC) and polyethylene terephthalate (PET).

22. The plastic drain sheet as claimed in claim 15, comprising a cover layer on at least one of the surfaces of the main body.

23. The plastic drain sheet as claimed in claim 15, comprising at least one reinforcing structure embedded into the main body.

24. The plastic drain sheet as claimed in claim 15, wherein the notches run parallel to the mating grooves.

25. The plastic drain sheet as claimed in claim 15, wherein the notches run parallel to a transverse direction of the plastic drain sheet.

26. The plastic drain sheet as claimed in claim 15, wherein the grooves are introduced in the direction perpendicular to the first surface with a depth d1 and the mating grooves are introduced in the direction perpendicular to the second surface with a depth d2, wherein the sum of d1 and d2 is one of greater than and equal to a sheet thickness of the main body.

27. The plastic drain sheet as claimed in claim 26, wherein the notches have a depth d3 perpendicular to the sheet plane, wherein the depth d3 is less than the sheet thickness of the main body minus the depth d2 of the mating grooves.

28. The plastic drain sheet as claimed in claim 15, further comprising mating notches, which are formed on the second surface by incisions in the main body in regions between the mating grooves.

\* \* \* \* \*